United States Patent [19]
Neilsen

[11] 3,791,492
[45] Feb. 12, 1974

[54] CALIPER BRAKE
[75] Inventor: William Neilsen, Seattle, Wash.
[73] Assignee: Hydrostatic Technology, Inc., Seattle, Wash.
[22] Filed: May 30, 1972
[21] Appl. No.: 257,922

[52] U.S. Cl. ............. 188/170, 188/72.5, 188/106 P
[51] Int. Cl. ........................................... F16d 65/24
[58] Field of Search ....... 188/72.3, 72.5, 106 P, 170

[56] References Cited
UNITED STATES PATENTS
3,280,933  10/1966  Jones ................................ 188/170
3,547,233  12/1970  Girvan .............................. 188/170

*Primary Examiner*—Duane A. Reger
*Attorney, Agent, or Firm*—Seed, Berry, Dowrey & Cross

[57] ABSTRACT

A brake mechanism for use in conjunction with a rotatable disk including a pad adapted to selectively contact each side of the disk during the braking operation. The pads are independently controlled and one pad is caused to frictionally engage the disk to selective application of a fluid pressure whereas the second pad is adapted to frictionally contact the disk by means of spring pressure which is enacted upon the happening of the predetermined condition. The mechanism is mounted relative to the disk such that the engagement of either of the pads causes the brake mechanism to move axially of the disk such that the disk is engaged from both sides. The fluid operated pad is retained in a non-engaging position by a spring means whereas the spring operated pad is retained in the non-engaging position by a fluid pressure such that a decrease in pressure will cause the pad to engage the disk thus stopping the disk. The mechanism further includes a manual means for compressing the spring in the absence of fluid pressure.

5 Claims, 2 Drawing Figures

PATENTED FEB 12 1974  3,791,492

CALIPER BRAKE

BACKGROUND OF THE INVENTION

There are many industrial environments which require brakes for retarding the motion of a machine in the event of a pressure failure or the like. The braking force is quite often applied through a disk mounted to a shaft and rotatable therewith.

A number of caliper type brakes are mounted to a stationary base adjacent the disk such that when a predetermined event or sequence of events occurs the brake will automatically be released applying a braking force to one or both sides of the rotating disk and thus stopping the disk and its attached shaft.

One of the problems with the installations of this type has been that it is extremely expensive to manufacture a disk which is completely uniform and thus the brake as applied to the disk may result in uneven braking and perhaps an unsafe condition. Thus, various methods and elaborate mechanisms have been devised and are used to compensate for unevenness of the disk, uneven brake wear and distortion of the disk or brake pad by the heat generated in the braking itself. Along this line attention is directed to the U.S. Pat. No. 3,547,233 granted to Girvan on Dec. 15, 1970 which requires not only that the disk be axially movable along the rotating shaft but further includes a complex fluid brake system to compensate for wear assuring an even braking force. Further examples of what has been done in the past with regard to braking in industrial machinery are illustrated by U.S. Pat. No. 3,456,767 granted July 22, 1969 to Hallnagle et al. and U.S. Pat. No. 3,500,970 granted Mar. 17, 1970 to Shilling. Both of the above noted references include a failsafe system wherein a predetermined event such as a loss of pressurized fluid within the system will initiate operation of the brake.

With the above noted problems and art in mind it is an object of the present invention to provide a caliper type disk brake for use on industrial machinery which is extremely simple of construction and is self compensating for uneven wear.

It is yet another object of the present invention to provide a brake for use with industrial machinery including a rotatable disk wherein the disk may be secured in one position along its axis and the brake mechanism itself is movable along the axis of the rotating disk to compensate for unevenness in the disk itself.

Yet another object of the present invention is to provide a failsafe brake system wherein the brake could be automatically applied in the event of a loss of fluid within the system but further may be manually released prior to reintroduction of fluid pressure.

It is still another object of the present invention to provide a failsafe brake mechanism which may also be selectively used and a condition not considered a failure for either slowing or stopping the machinery.

It is still a further object of the present invention to provide a failsafe type caliper brake wherein the pressure necessary for holding the failsafe portion in an inoperable position, i.e., ready, need not be the same as that used for selectively operating the brake at times other than failure.

DETAILED DESCRIPTION OF THE DRAWINGS

Figures 1, 2:
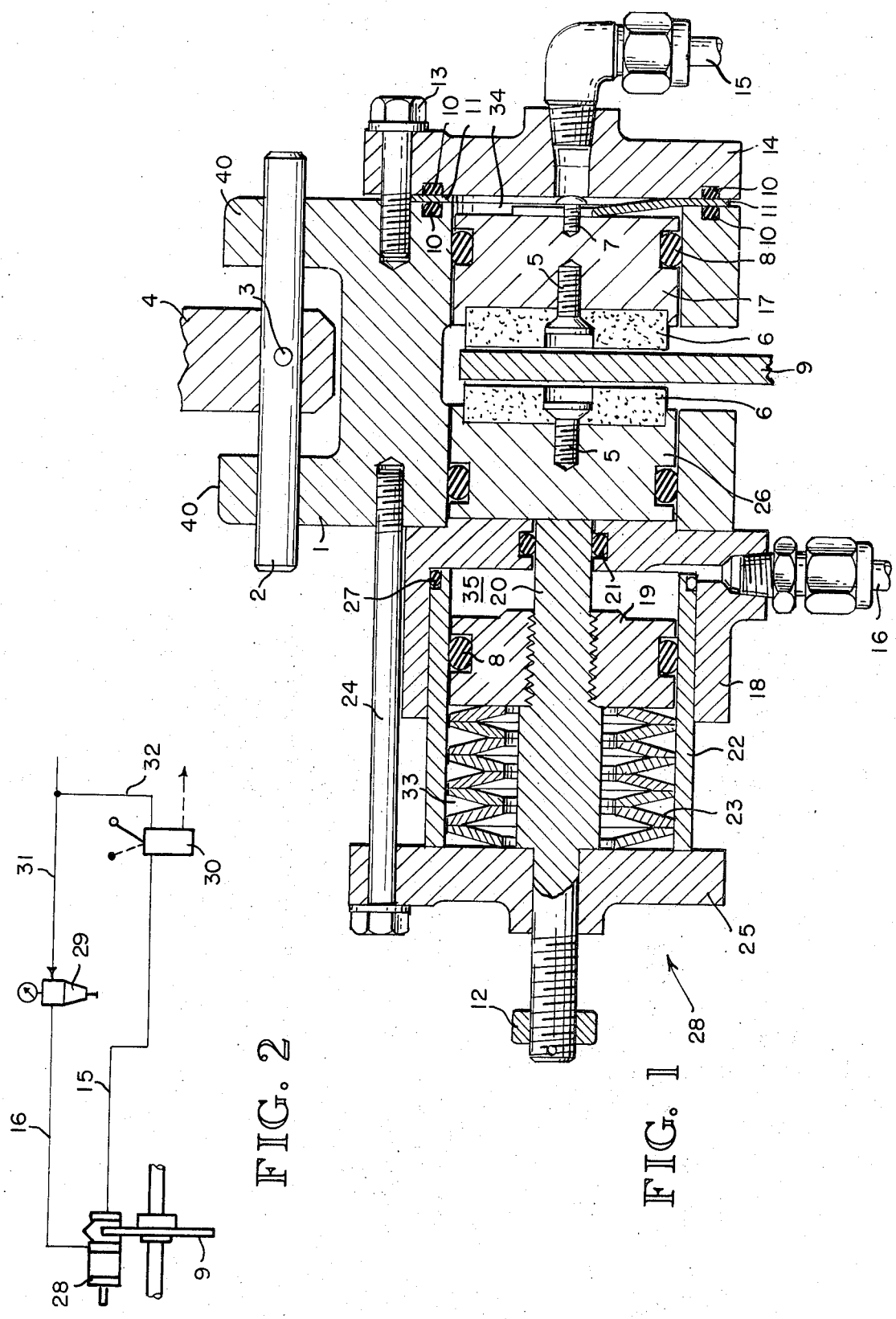
FIG. 1 is a sectional view of the brake incorporated in FIG. 2.
FIG. 2 is a schematic representation of a brake system incorporating the brake of this invention.

In the preferred embodiment of the invention, as illustrated, a brake system is shown in FIG. 2 as comprising a rotatable braked member in the nature of a rotary disk 9. A failsafe and pressure set brake 28 is mounted adjacent the disk and is fed by regulator 29 and controlled by valve 30. Conduit means interconnecting the brake 28, regulator 29, and valve 30 includes a primary conduit 31, branch conduit 32, pressure set conduit 15 and failsafe release conduit 16.

Referring now to FIG. 1, the brake 28 is secured to a machine mounting brace 4 by a mounting rod 2 secured in place by a set screw 3. The brake body 1 is slidably mounted to the mounting rod 2 by a pair of ears 40 such that freedom of movement is allowed in the axial direction of the rotatable disk. The body 1 is closed at one end by a cap 14 which is secured to the body 1 by a plurality of bolts 13.

A plurality of bolts 24 secure another cap 25, cylinder 22 and pressure body 18 to the opposing end of the brake body 1. The pressure set brake pad 6 located at the right (FIG. 1) of the rotating disk 9 is secured to the pressure set piston 17 by a screw 5. Another screw 7 attaches the pressure set piston 17 to the return spring 11. Seals 8 and 10 are used to provide a pressure tight chamber 34 between the cap 14 and the pressure set piston 17 such that an introduction of pressure into chamber 34 will cause pad 6 to engage disk 9 and a release of pressure will allow spring 11 to move the pad to nonengaging position.

The failsafe brake pad 6 located on the left (FIG. 1) of the rotating disk 9 is attached to the follower 26 by a screw 5. Movement of the follower 26 is initiated by the piston rod 20 which responds to fluid pressure acting upon piston 19. The piston 19 is mounted concentrically on the piston rod 20 by means of machined threads. The piston rod 20 extends axially through the pressure body 18, the cylinder 22 and the cap 25. A pressure tight chamber 35 is formed by seals 8, 21 and 27 around the piston 19, the piston rod 20 and the cylinder 22.

The cap 25, the cylinder 22, the piston 19 and the piston rod 20 define an annular spring chamber 33 in which is mounted a plurality of annular spring disks commonly known as Belleville springs 23. A compression force can be applied to the Belleville springs 23 by tightening the connecting rod nut 12 threaded to the piston rod 20.

When fluid pressure is supplied to the system through he primary conduit 31, the regulator 29 provides fluid at the desired pressure to the failsafe release conduit 16. Fluid pressure is also supplied through the branch conduit 32 to the control valve 30. The chamber 35 formed by the pressure body 18, the cylinder 22 and the piston 19 is filled with fluid under pressure from the failsafe release conduit 16. The pressure causes the piston 19 and the piston rod 20 to move to the left (FIG. 1) against the tension of the Belleville springs 23. When the Belleville springs 23 are comprssed, there is no force exerted on the follower 26, the fluid in chamber 35 balancing the spring force. The follower 26 and attached brake pad 6 then move away from the rotating disk 9 and offer no frictional resistance to rotation of disk 9.

Braking action occurs when the valve 30 is opened to introduce fluid to pressure set conduit 15. The piston 17 travels toward the rotating disk 9 and when the brake pad 6, attached to the piston 17, contacts the rotating disk 9, the entire brake body 1 moves axially to the right (FIG. 1) along the mounting rod 2. This movement brings the brake pad 6 attached to the follower 26 into contact with the rotating disk and the axial movement of the brake body 1 continues until the follower 26 butts against the pressure body 18, thereby applying braking pressure to the rotating disk 9. When pressure is relieved, by changing the valve 30, the piston 17 moves away from the rotating disk 9 under the influence of the return spring 11. The brake body is now free to move axially along the mounting rod to relieve any braking pressure caused by unevenness or distortion of the rotating disk 9.

When pressure is released from the failsafe conduit 16, either intentionally or because of a failure in the system, the Belleville springs 23 move the piston 19 and piston rod 20 to the right (FIG. 1). The piston rod 20 pushes against the follower 26 and causes the follower 26 and attached brake pad 6 to move toward the rotating disk 9. When the brake pad 6 attached to the follower 26 contacts the rotating disk 9, the entire brake body 1 moves axially to the left (FIG. 1) along the mounting rod 2 bringing the brake pad 6 attached to the piston 17 into contact with the rotating disk 9. The axial movement of the brake body 1 continues until the piston 17 butts against the cap 14 thereby applying braking pressure to the rotating disk 9.

Braking pressure is released by restoring fluid pressure to the failsafe conduit 16 as already described. In some applications it is desirable to release the failsafe brake before fluid pressure can be restored and this is accomplished by tightening the connecting rod nut 12. The nut 12 bears against the cap 25 drawing the piston rod 20 and piston 19 to the left (FIG. 1) along the mounting rod 2 bringing the brake pad 6 attached to the piston 17 into contact with the rotating disk 9. The axial movement of the brake body 1 continues until the piston 17 butts against the cap 14 thereby applying braking pressure to the rotating disk 9.

Braking pressure is released by restoring fluid pressure to the failsafe conduit 16 as already described. In some applications it is desirable to release the failsafe brake before fluid pressure can be restored and this is accomplished by tightening the connecting rod nut 12. The nut 12 bears against the cap 25 drawing the piston rod 20 and piston 18 to the left (FIG. 1) which removes the force on the follower 26 and attached brake pad 6. It is understood that the mechanism is designed such that the relevent pistons and springs have sufficient expansion capacity to accommodate the movement anticipated.

It will be appreciated by those familiar with the art that either hydraulics or pneumatics can be used to operate this invention. If desired pneumatics can be used to operate one side while hydraulics operate the other side or fluids of different pressure values may be used on each side.

It will also be appreciated by those familiar with the art that the axial movement of the brake body 1 along the mounting rod 2 provides a self-compensating feature that allows proper contact and alignment between brake pads 6 and rotating disk 9 even when unequal wear on the brake pads 6 exists or if the rotating disk 9 is distorted.

Thus it can be seen, the present caliper brake assembly serves to selectively stop the rotating disk or alternatively be automatically engaged following the happening of a predetermined event. The brake automatically compensates for unevenness in the brake disk or distortion by heat or the like.

The embodiments of the invention in which an exclusive property or privilege is claimed are defined as follows:

1. A brake mechanism for use in conjunction with a rotating disk comprising;
    a housing member including a slot adapted to be mounted adjacent a rotatable disk such that the disk extends into the slot,
    a fluid pressure operated brake pad mounted within the housing at one side of the slot for selective movement into the slot for frictional engagement with the disk,
    a spring operated brake mounted to the other side of the slot for selective movement into the slot for frictional engagement with the disk,
    means for retaining the spring operated pad out of engagement with the disk, said means responsive to a preselected condition to release this pad and frictionally engage the disk,
    mounting means adapted to retain the housing in operational condition relative to the disk while allowing movement relative to the axis of rotation of said disk whereby the engagement of either brake pad will urge the housing to move until the disk is contacted upon both sides by the brake pads thus compensating for any irregularities in pad wear or disk configuration.

2. A brake mechanism as in claim 1 wherein the spring force is provided by Belleville washers.

3. A brake mechanism as in claim 1 and further including a manual means to override the springs and release the brake even though the preselected condition has occurred.

4. A brake mechanism as in claim 1 wherein the fluid pressure for operating one of the pads may vary in quantity from that necessary to retain the other pad inoperative.

5. A brake mechanism as in claim 4 wherein the fluid may selectively be hydraulic or pneumatic.

* * * * *